July 19, 1932.　　P. DE MATTIA　　1,867,734
TIME CONTROLLING MECHANISM FOR VULCANIZING MOLDS
Filed July 5, 1928　　6 Sheets-Sheet 1

INVENTOR.
Peter de Mattia
BY Morrison, Kennedy Campbell
ATTORNEYS.

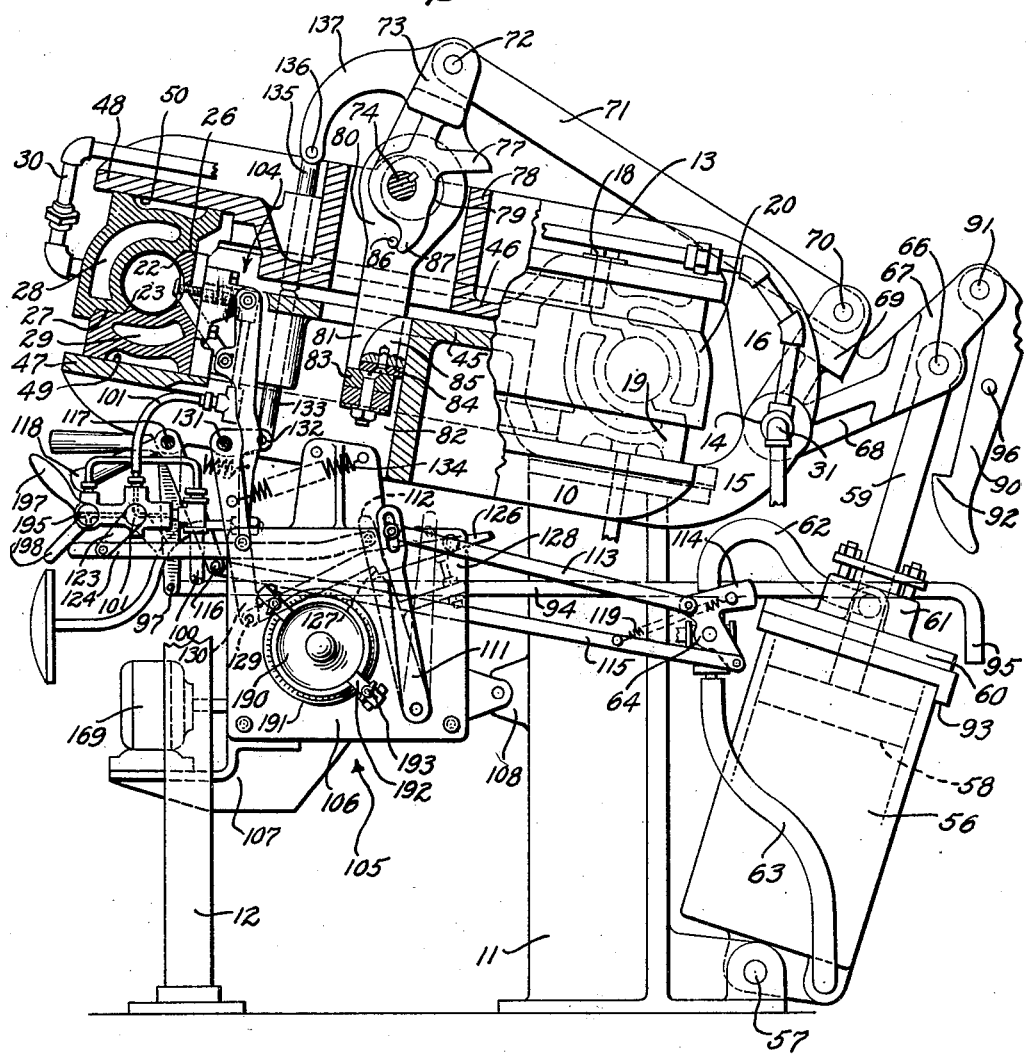

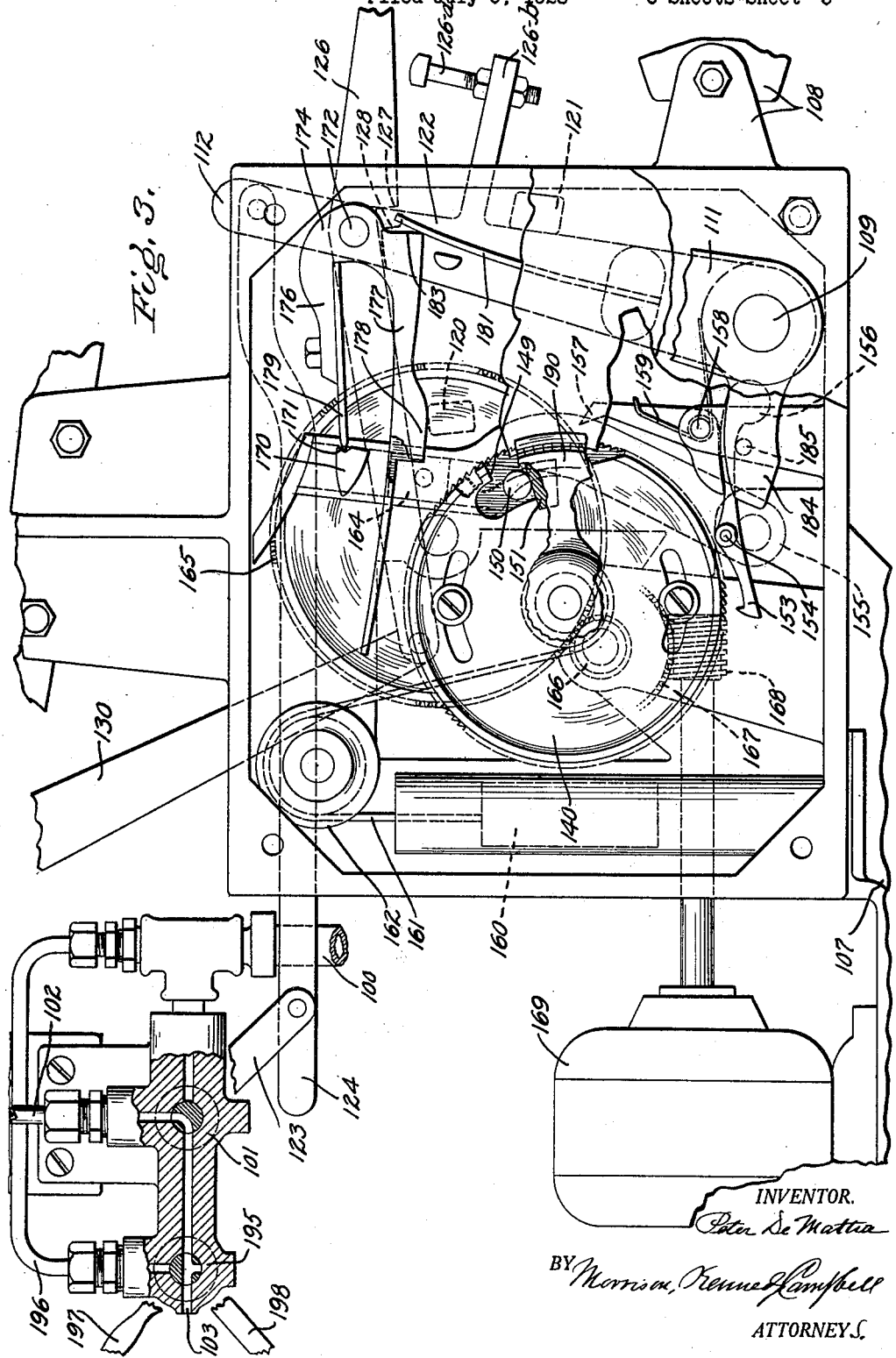

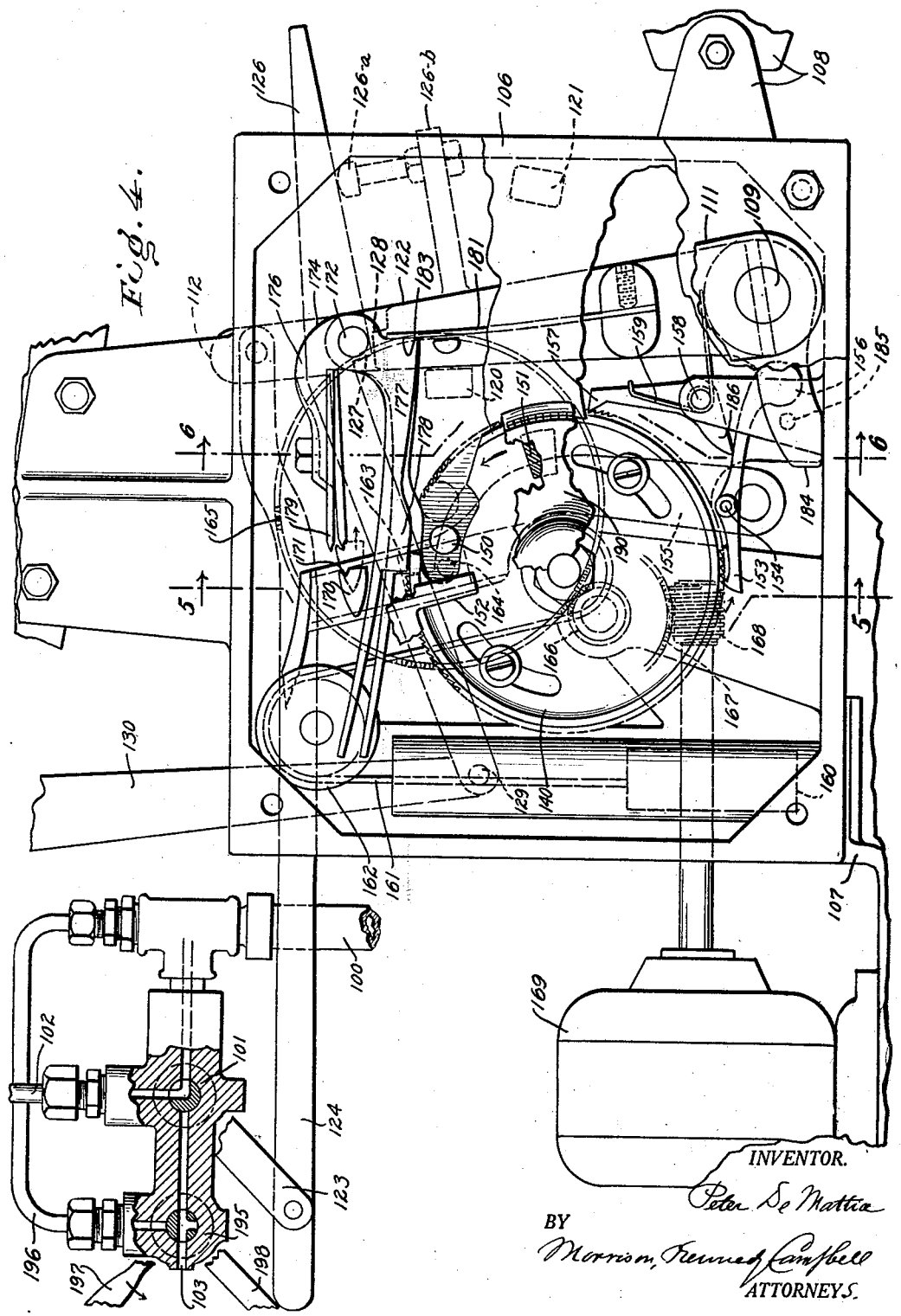

July 19, 1932.  P. DE MATTIA  1,867,734
TIME CONTROLLING MECHANISM FOR VULCANIZING MOLDS
Filed July 5, 1928    6 Sheets-Sheet 5
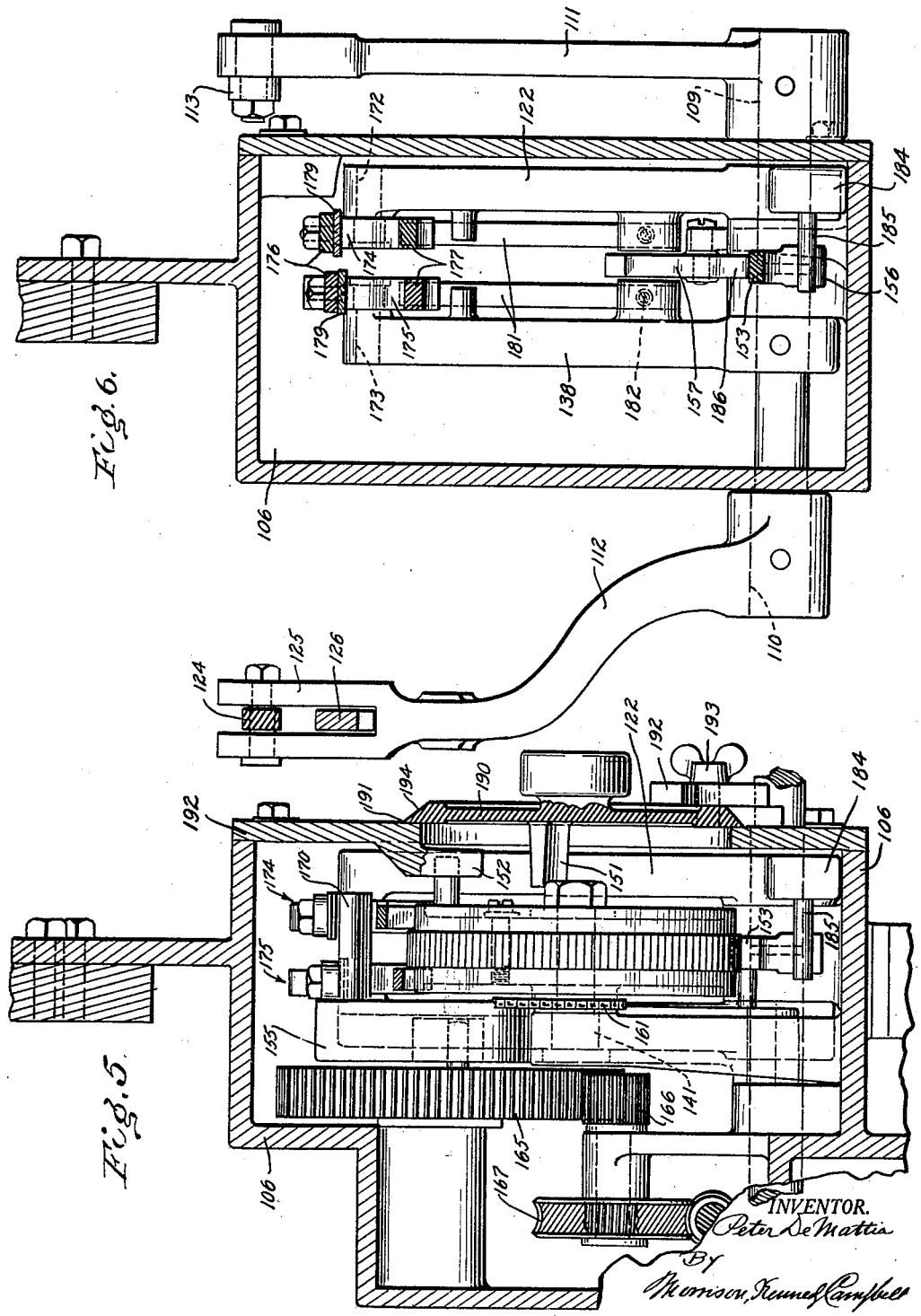

July 19, 1932.  P. DE MATTIA  1,867,734
TIME CONTROLLING MECHANISM FOR VULCANIZING MOLDS
Filed July 5, 1928  6 Sheets-Sheet 6
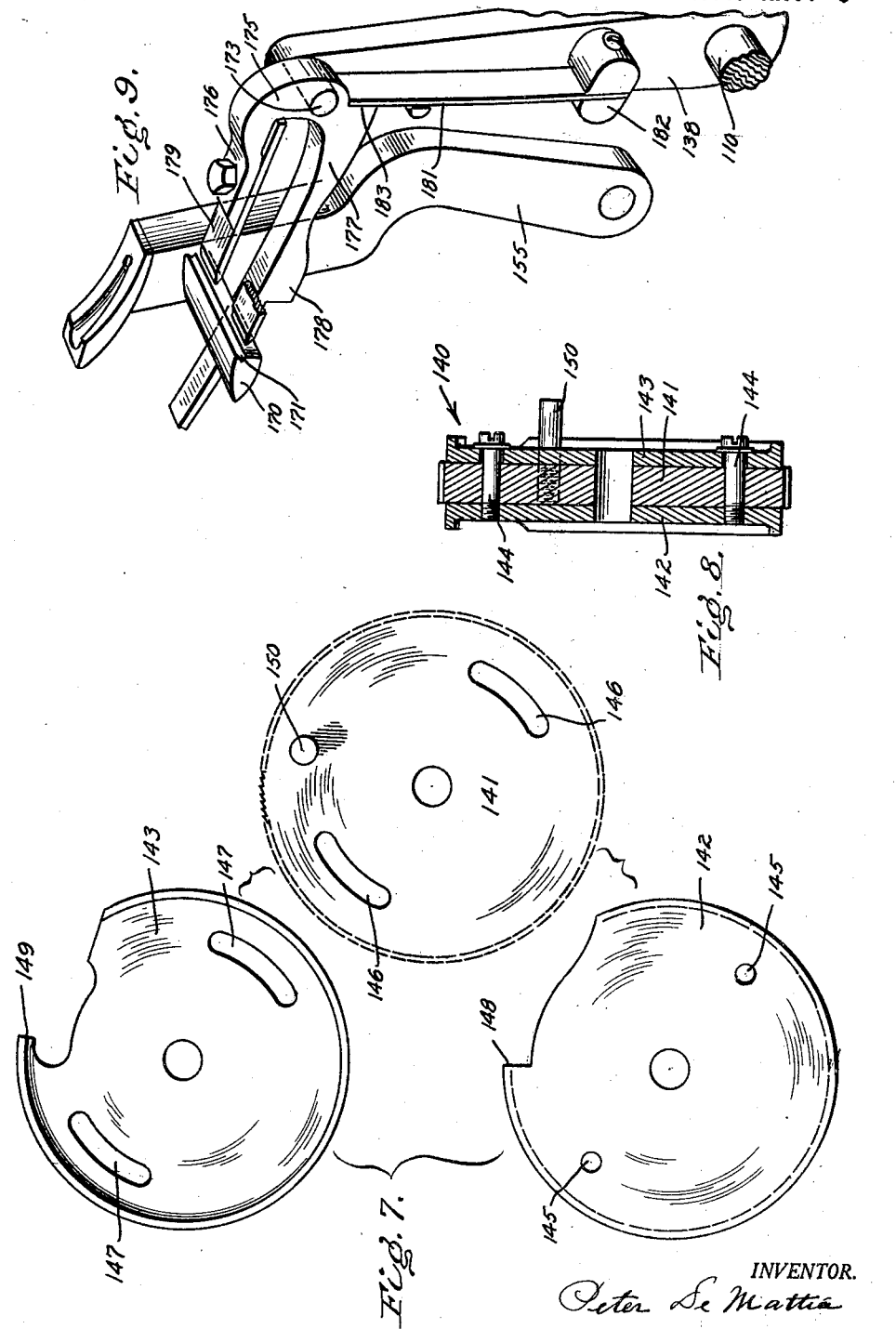
INVENTOR.
Peter De Mattia
BY
Morrison, Kennel Campbell
ATTORNEYS Patented July 19, 1932

1,867,734

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

TIME-CONTROLLING MECHANISM FOR VULCANIZING MOLDS

Application filed July 5, 1928. Serial No. 290,337.

This invention relates to vulcanizing apparatus, and refers particularly to time-controlling means for vulcanizing molds and presses used in the production of inner tubes, pneumatic tires, and similar articles.

An important object of the invention is to provide means for automatically inflating and deflating the tubes or tires and for opening the molds at the end of a definitely measured time cycle intended to give the proper degree of vulcanization.

In my pending application Serial No. 271,695, filed April 21, 1928, I have disclosed a vulcanizing press wherein a pair of mold sections are hingedly connected together and provided with power mechanism for swinging one of the sections to open and closed positions. The power mechanism includes a pressure cylinder having a piston connected by suitable levers and links to the swinging section, and a manually operated valve to control the passage of pressure fluid to and from the cylinder. Other means including a manually operated valve are provided for inflating and deflating the tube or tire confined within the mold sections. In the operation of said press, the opening and the closing of the mold, as well as the inflation and deflation of the article being vulcanized, are all performed manually, and hence it is necessary for the attendant to watch the machines very closely to prevent either overcuring or undercuring of the stock. This is not only troublesome, but inherently difficult, because in actual practice the attendant is usually required to look after a whole battery of vulcanizers all in operation at the same time, except of course for the loading and unloading periods.

According to the present invention, practically all of the foregoing operations are carried out and regulated automatically, there being employed an automatic timing device which not only controls the inflation and deflation of the tube or other article, but which also effects after vulcanization, the opening of the mold automatically and in proper sequence, thus requiring little or no attention on the part of the operator. In the embodiment illustrated, the timing device is located below the fixed mold section and has operating parts which are connected with both the cylinder control valve and the inflation and deflation valve. There are two sets of actuating mechanisms, one for each valve, mounted together and operated in properly timed relation from a single continuously driven power shaft. This power shaft, through suitable gearing, operates two constantly reciprocating members, which under the control of suitable trip mechanism are caused periodically to operate two other members or levers connected to the two different valves. Adjustments are provided for, so that the vulcanizing period can be varied to suit the requirements of the particular article being vulcanized, and so that the time elapsing between the deflation of the article and the opening of the mold can also be varied if and when desired.

Prior to or simultaneously with the closing of the mold, air may be admitted into the tube or other article to be vulcanized if not inflated beforehand, whereby to enable it by partial inflation to become properly seated within the mold cavity, but the full inflation, whereby to impose the final vulcanizing pressure, is not effected until the mold is entirely closed and locked, and then it is effected automatically by the setting of the timing device through the locking action of the press. In other words, the operator manually operates the cylinder valve to control the closing and locking-up of the mold, but the remaining operations, i. e. the full pressure inflation and the subsequent deflation of the article as well as the unlocking and reopening of the mold, are all carried out automatically by the time-controlling mechanism.

The foregoing and other objects, features and advantages of the invention will be fully appreciated from the following description in connection with the accompanying drawings, wherein one form of the invention has been shown by way of illustration, and wherein Fig. 1 is a side elevation of a vulcanizing press equipped with time-controlling mechanism in accordance with the invention, the parts being shown with the press in open position;

Fig. 2 is a similar view, with parts broken away and parts in section, showing the press closed;

Fig. 3 is an enlarged detail view of the time-controlling mechanism, with the parts in positions corresponding to those of Fig. 1;

Fig. 4 is a view similar to Fig. 3, but with the parts set to deflate the tube and otherwise corresponding to the conditions of Fig. 2;

Fig. 5 is a vertical transverse sectional view approximately on the line 5—5 of Fig. 4;

Fig. 6 is a vertical transverse sectional view approximately on line 6—6 of Fig. 4;

Fig. 7 is an exploded view of the composite control disc of the timing mechanism;

Fig. 8 is a detail sectional view through the composite disc per se; and

Fig. 9 is a detail perspective view of one of the periodically operated members and its intermediate connection with the constantly reciprocating member.

Figure 1:
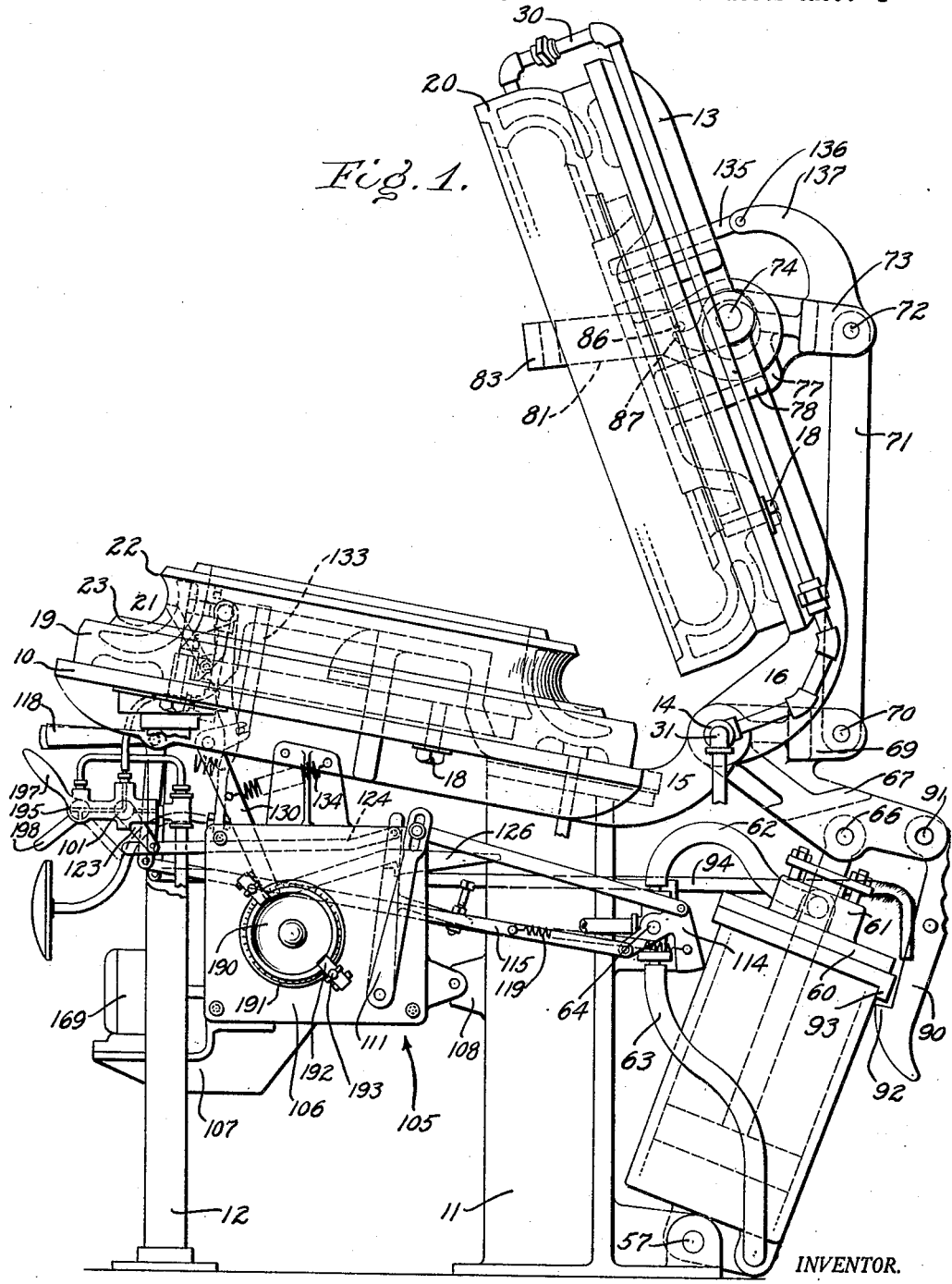

While the invention has been disclosed in the drawings as applied to a vulcanizing press, it is, of course, to be understood that it can be applied equally well to a vulcanizing mold whose sections are pivoted directly together rather than carried by pivoted press platens and, so far as this invention is concerned, the two are considered as analogous.

The vulcanizing press shown in the drawings comprises a lower fixed platen or bed 10, supported by standards or base members 11 and 12, and an upper swinging platen or bed 13, pivoted to the fixed platen by a pin or bolt 14 extending through apertured ears 15 and 16 of the respective platens. Secured to the respective platens 10 and 13, as by cap screws 18, is a pair of opposed annular mold sections 19 and 20, the meeting faces of which are grooved to provide a continuous annular mold cavity 21, within which an inner tube or similar article is confined during vulcanization. In the illustrated embodiment (see particularly Fig. 2), the mold cavity 21 is circular in cross section and is equally divided between the two mold sections 19 and 20, the parting lines of which, at the inner and outer peripheries, intersect the mold cavity at diametrically opposite points 22 and 23, respectively, located on opposite sides of, and of course at equal distances from, the central circumferential plane of the mold. In other words, said parting lines intersect the cavity 21 circumferentially in such a manner as to define a truncated cone whose sides pass diagonally through the center of the mold cavity and whose apex is located in the direction of the opening movement of the movable section 20 as it is carried upwardly by the platen 13. With this arrangement, it will be observed that the lower mold section 19 presents a side wall to engage the green or unvulcanized tube throughout the major portion of its radial extent, and an overhanging inner wall to engage the tube throughout its base or the major portion of its axial extent. The meeting faces of the two mold sections extend obliquely from the points 22 and 23 through part of the mold wall, and thence are off-set in planes 26 and 27, located at opposite sides of but parallel to the central circumferential plane. The beveled or inclined portions 24 and 25 form a tapered bore fit serving to accurately register the mold sections when in closed relation, and thus provide a fluid-tight joint to prevent the formation of rinds or fins on the vulcanized tube, the flat or parallel portions 26 and 27 being slightly spaced apart to provide the necessary clearance. This particular form of mold per se, which is designed especially for vulcanizing inner tubes, forms the subject of my pending application Serial No. 263,623, filed March 22, 1928, to which reference may be had for further details.

The mold sections 19 and 20 (rather than the press platens) are individually heated by the circulation of steam or other heating fluid through heating chambers or jackets 28 and 29, which surround the mold cavity 21, such steam being supplied to the upper heating chamber 28 through a pipe 30 having a swivel joint 31 at one end of the hinge pin 14, and to the lower heating chamber 29 through a similar pipe not shown. Suitable drain pipes are also provided to draw off condensation and facilitate circulation of the heating medium, but since this forms no part of the present invention, details thereof have been omitted. By providing the mold sections directly with heating jackets, a better and more uniform cure is obtained, and this especially when molds of different sizes are to be interchanged.

In the particular press illustrated, the platens 10 and 13, respectively, comprise central web portions 45 and 46, which are relatively close together when the press is closed, and offset annular table or flange portions 47 and 48 which are parallel to each other and have their opposing faces 49 and 50 machined and spaced apart a distance equal to the thickness of a pair of mold sections.

In order to move the platen 13 and its mold section 20 to open and closed positions, and to lock and unlock the press, the following means are provided. A pressure cylinder 56 (Figs. 1 and 2) has its lower end pivoted to the standard 11, as at 57, and is provided with a reciprocating piston 58 secured to a piston rod 59 which extends through the upper cylinder head 60 and stuffing box 61. A suitable pressure fluid, such as water, steam, or compressed air, is admitted to the cylinder 56 alternately at opposite sides of the piston 58 through flexible conduits 62 and 63 under the control of a four-way valve 64, which is operable in one direction or the other in a manner to be hereinafter described. The upper end of the piston rod 59 is connected, as at 66, to the longer arm 67 of a bell-crank lever 68, mounted to rock upon the hinge pin 14, and whose shorter arm 69 is pivoted at 70 to one end of a link 71. This link 71 extends inwardly over the upper platen 13 and has its other end pivoted at 72 to a lever arm 73 extending upwardly at or near the center of the press. Said lever arm 73 is fast to a rock shaft 74, journaled at the top of the platen 13, and is characterized by an extension or lug 77 on its rearward side which is adapted to abut against a fixed stop portion 78 (Fig. 2) to limit the rocking movement of the lever with reference to the swinging mold section. A pair of eccentrics 79 is provided on the rock shaft 74 to support the spaced straps 80 of a U-shaped latch or clamping member 81 which depends through a substantially central opening 82 in the fixed platen 10, and which is provided at its lower end with a detachable wear block 83 adapted to engage against the underside of a similar wear plate 84 at the lower end of a locking lug 85 on said fixed platen. In order to swing the locking member or latch 81 into and out of engagement with the lug 85, the latch straps are provided with a rigid cross pin 86 disposed in the path of movement of a toe portion 87 of the lever arm 73, and said pin is maintained against said toe portion by the gravitating action of the latch member. Consequently, as the platen 13 comes to rest in its closing movement, the latch member 81 swings by gravity under the locking lug 85 and is then drawn upwardly by the eccentrics 79 with a powerful clamping pressure. In the opening operation, the lost motion of the lever arm 73 with reference to the movable platen 13 permits the latch member 81 to be disengaged from and swung clear of the lug 85 by the contact of the toe portion 87 with the pin 86, before the lever extension 77 comes into contact with the fixed stop portion 78 of the platen, after which the upward swinging of the platen is effected as if the lever arm 73 were formed integrally with the platen.

From the foregoing construction, it will be apparent that the pressure cylinder 56 not only acts to raise and lower the upper swinging platen 13 in opening and closing the press but it also serves by the pressure which it exerts through its connections with the platen to hold the latter firmly and securely in its closed position. While the pressure thus exerted by the cylinder is or could be made great enough to clamp the swinging platen in its closed position, especially when the tube undergoing vulcanization is inflated under a relatively low pressure, the cylinder pressure in the embodiment illustrated is greatly multiplied by the employment of the lever arm 73 and the eccentrics 79 through which the cylinder pressure is transmitted to the clamping member 81.

It is desirable to lock the swinging platen and its mold section in open position in order to prevent its accidental or premature closing, and for this purpose a dog 90 (Figs. 1 and 2) is pivotally suspended at 91 on the long arm 67 of the bell-crank lever above the pressure cylinder 56. Adjacent its lower end, the dog 90 is provided with a shouldered projection 92 which, when the press is opened, is adapted to slide past and catch below a shoulder 93 on the upper end of the cylinder 56, the dog being influenced by gravity to effect this engagement automatically. Thus when the press is opened, it will be held open independently of the fluid pressure in the cylinder, and cannot be closed again until the dog has been released. Its release is effected by means of a second hand bar 94 (see also Fig. 2), which is longitudinally slidable below the fixed platen 10 and which has its rearward end bent downwardly as at 95 whereby to engage against a projecting pin 96 carried by the dog 90. The forward end of the bar 94 is pivoted at 97 to one arm of a bell-crank lever 98, the other arm of which is accessible as a handle at the front of the press, and by it the bar can be pushed rearwardly, when desired, to release the projection 92 from its engagement with the shoulder 93. Then the valve 64 can be manipulated to supply pressure fluid to the lower side of the cylinder 56 causing the press to be closed. A spring (not shown) may be attached at one end to the lower platen 10 and at its opposite end to the bar 94 to pull constantly on the bar to hold it in its forward inactive position.

The foregoing parts and their mode of operation are or may be the same as set forth in my prior application Serial No. 271,695, above referred to, and for any further details reference may be had to that application.

Compressed air, or other fluid under pressure, is supplied for inflating the tube within the mold cavity 21 from a pipe 100, the inflation and deflation of the tube being controlled by a three-way valve 101, which selectively provides communication between the supply pipe 100 and a pipe 102, and between said pipe 102 and an exhaust port 103 which opens to the atmosphere. The pipe 102 extends upwardly through the fixed platen 10 and is provided at its extremity with suitable coupling means 104 by which it may be connected to the inner-tube valve-stem which projects through the wall of the mold section 10. The coupling means 104 specifically illustrated in the drawings is one which has been developed to make a quick and fluid-tight connection with the valve stem, and is more fully disclosed in my application Serial No. 302,710, filed Aug. 29, 1928.

Coming now to the present invention: The pressure cylinder valve 64 and the tube inflation valve 101 are so coordinated as to insure their operation in a definite sequence, and this is accomplished by means of the automatic control means 105, which includes a substantially rectangular housing 106 secured to suitable supports 107 and 108 on the standards 11 and 12. Referring particularly to Figs. 3 to 9, two rock shafts 109 and 110 are supported in axial alinement in the housing 106, each shaft having one of its ends extending outwardly through and beyond a wall of the housing, and at their protruding ends, the two shafts 109 and 110 are provided with levers 111 and 112, respectively.

The lever 111 (Fig. 2) is pivotally connected by a link 113 to the upper arm of a double-armed lever 114 centrally secured to the barrel of the cylinder control valve 64, the rocking movement of the lever being intended to give the valve barrel a quarter turn or a movement of substantially 90°. The lower arm of the lever 114 is pivotally connected by a forwardly extending link 115 to the longer arm of a bell-crank lever 116, centrally pivoted to the lower platen at 117, and whose shorter arm 118 serves as a handle by which it may be manually operated. A tension spring 119, attached at its opposite ends to the link 115 and arm 114, tends constantly to keep the parts in either of its extreme positions as shown in Figs. 1 and 2. These extreme positions are defined by a pair of fixed abutments 120 and 121 within the housing 106, and which lie in the path of movement of a member or arm 122 secured to the shaft 109 adjacent its inner end.

The lever 112 is connected to the inflation valve arm 123 by a link 124, and is further characterized by a bifurcated upper end 125 (Fig. 6) in which is disposed a sliding dog 126 having a shouldered portion 127 adapted, under certain conditions, to engage a shoulder 128 at the bottom of the bifurcation to rock the lever and shaft, see Figs. 2 and 4. The dog 126 is pivoted, as at 129, to the longer arm 130 of a bell-crank lever, which in turn is pivoted at 131 to the lower side of the platen 10, and whose shorter arm 132 is connected to an upstanding rod 133 adapted to slide through an opening in the platen portion 45. A tension spring 134 acts upon the long arm 130 of the bell-crank in such manner as to normally draw it toward the right as viewed in Figs. 1 and 2, and in this condition, when the mold is open, the upper end of the rod 133 extends a substantial distance above the upper surface of the platen portion 45 (see Fig. 1). Slidably mounted in the upper platen 13, in axial alinement with the rod 133, is another rod 135 which is pivoted, as at 136, to a hook-shaped extension 137 of the before-mentioned locking lever 73. According to this arrangement of the parts, when the mold is closed, the inner ends of the rods 133 and 135 will come into contact, and the final locking movement of the lever 73 will result in the depression of the rod 133, rocking bell-crank arm 130 and drawing the dog 126 forwardly or to the left as shown in Fig. 2. By virtue of the engagement of the shouldered portion 127 of the dog 126 with the shoulder 128 of the lever 112, the latter will simultaneously be rocked forwardly and, through the link 124, it will move the arm 123 of the inflation valve from the position shown in Fig. 1 to the position shown in Fig. 2, whereby to permit the passage of air or other inflating fluid to the tube confined within the mold cavity 21. In the final forward movement of the dog 126, it is gradually raised by the the head of a screw $126^a$ carried on an extension $126^b$ of the lever 112 (Figs. 3 and 4) whereby to disengage the shouldered portion 127 of the dog from the shoulder 128 of the lever, leaving the latter free to be moved rearwardly in the subsequent operation of the time-control mechanism.

Within the housing 106, the shaft 110 has secured to it an arm 138 which is similar in all respects to the arm 122 before described, and which, like that arm, is also movable between two fixed abutments.

A composite control disc 140 is journaled, as at 141, for rotation within the housing 106, being located in the space between the arms 122 and 138. This composite disc, as best shown in Figs. 7 and 8, comprises a central ratchet wheel 141 and a pair of trip discs or cams 142 and 143 disposed at opposite sides of the ratchet and secured thereto by clamping screws 144. These screws are anchored in screw-threaded sockets 145 in the disc 142 and extend through arcuate slots 146 and 147 in the ratchet wheel 141 and disc 143 respectively. At a suitable point in its periphery, the disc 142 is cut away to provide a shoulder 148 which cooperates with a trip device to cause movement of the arm 138 in one direction, and similarly the periphery of the disc 143 is cut away to provide a shoulder 149 which cooperates with a trip device to cause movement of the arm 122. The ratchet wheel 141 is employed to impart an intermittent movement to the discs 142 and 143, but is limited in such movement by a pin 150 projecting outwardly therefrom and which is adapted to engage with fixed stops 151 and 152 on the inner wall of the housing (Fig. 5).

The intermittent movement is imparted to the ratchet wheel by a pawl 153 which is pivoted at 154 on a rocking arm 155, presently to be described, said pawl 153 having a weighted extension 156 which maintains its tooth in constant engagement with the teeth of the ratchet wheel. Another pawl or detent 157 is pivoted at 158 in the housing and is maintained in engagement with the ratchet wheel by a spring 159 to prevent retrograde movement of the ratchet wheel when the pawl 153 is making its return stroke. Normally the composite disc 140 is urged to turn in a clockwise direction as viewed in Figs. 3 and 4 to a starting position where the pin 150 will abut against the stop 151, this being accomplished either by means of a spring or, as shown in the drawings, by a weight 160 connected to a chain or cable 161 which extends over a guide pulley 162 and has its other end secured to a winding drum or the like fast to the composite disc.

The rocking arm 155 above mentioned is fitted with a sliding crosshead 163 (Figs. 3, 4 and 5) having a pin 164 connected with a gear 165, the pin 164 being eccentric with reference to the axis of rotation of the gear 165, whereby to impart the rocking movement to the arm 155. The gear 165 may be driven in any suitable manner, such as by a pinion 166 (Fig. 5) which is rotatable as a unit with a worm gear 167 meshing with a screw or worm 168 driven by an electric motor 169. The arm 155 is also provided on the side opposite the gear 165 with a laterally extending bar or member 170 disposed above the composite disc 140, and which is formed in one edge with a V-shaped notch or groove 171 for periodic engagement with the interponents next to be described.

Pivoted at 172 and 173, respectively, upon the arms 122 and 138 are two interponents 174 and 175 by means of which motion is periodically communicated to the arms from the constantly reciprocating bar 170. Each of the interponents (which are identical) includes an upper arm-connecting portion 176 which overlies the path of travel of the bar 170, and a lower trip portion 177 disposed below the path of said member. The lower trip portions 177 are provided, intermediate their ends, with shouldered projections 178 adapted to ride on the peripheries of the respective discs 142 and 143 and so arranged that when the shoulders 148 and 149 of the discs pass beyond these shouldered projections 178, the interponents drop by gravity, swinging about their pivots, and carry with them tappet members 179 secured to the upper portions 176. During the vulcanizing operation these tappets 179 are maintained in a plane above that of the reciprocating bar 170 by virtue of the engagement of the shouldered projections 178 with the peripheries of the discs 142 and 143, but when they are allowed to fall, they come into the path of movement of said bar and their free ends (which are tapered as at 180 to seat in the V-groove 171) are engaged by the bar 170, which then rocks the arms 122 and 138 to the right. In the latter movement, the interponents are rocked slightly about their pivots 172 or 173 in a downward or counterclockwise direction, causing shoulders 183 on the interponents to bear against and deflect the free upper ends of light flat springs 181 secured, as at 182, to the arms 122 and 138 (see Fig. 3). On the subsequent return stroke of the reciprocating bar 170, the springs 181 act to rock the interponents in the opposite direction, to a position limited by the seating of the flat ends of the shoulders 183 against the springs, in which position the free ends of the tappets are lifted above the path of movement of the bar 170, so that the latter may continue to move to and fro without affecting the arms 122 and 138 until the trip portions 177 of the interponents bring them again into action. In this connection, it is pointed out (see Figs. 4 and 7) that the shoulders 148 and 149 of the discs 142 and 143 are circumferentially spaced from each other in such manner that the interponent 175 of the inflation control arm 138 will be brought into action earlier than the interponent 174 of the cylinder control arm 122, this arrangement being made in order that the tube within the mold cavity 21 will be deflated prior to the automatic opening of the mold. The interval between the dropping of the two interponents may be varied by loosening the screws 144 and turning the disc 143 with reference to the disc 142.

As best shown in Figs. 3, 4 and 6, the cylinder control arm 122 is provided at its lower end with an extension 184 carrying a transverse pin 185 which is adapted to engage the lower side of the weighted arm 156 of feed pawl 153 and disengage the same from the ratchet wheel 141. The retrograde pawl or detent 157 is likewise provided with a toe portion 186 which bears against the weighted arm 156 when the pawl 153 is disengaged and simultaneously disengages the detent from the ratchet. There is of course, some lost motion provided between the pin 185 and the pawl arm 156 so that the pawls will not be disengaged until the arm 122 has reached its extreme position to the right as shown in Fig. 3. When the two pawls are thus disengaged from the ratchet wheel 141, the weight 160 drops by gravity and acts through the cable 161 to return the composite disc 140 to its original position with the pin 150 in engagement with the stop 151, this position being also shown in Fig. 3.

In order to vary the vulcanizing period, the stop 151 is mounted upon an adjustable disc or dial plate 190 seated in a circular opening 191 in the cover 192 of the housing 106. This dial plate 190 is normally held in adjusted position by clamping members 192 and wing nuts 193, and if desired may be provided with suitable graduations or other indicia 194 to guide the operator in fixing the vulcanizing period or the time which will elapse in the travel of the pin 150 from the stop 151 to the stop 152. It will now be clear that the position of the stop 151 determines the starting position for the composite disc 140 in each vulcanizing cycle, so that by moving it either toward or away from the stop 152, the distance through which the composite disc will have to travel before the interponents 174 are tripped may be lengthened or shortened as desired.

If the tube has not been pre-inflated, it may be desirable to partially inflate the same prior to or simultaneously with the closing of the mold, and this is accomplished by means of an auxiliary inflation valve 195, which is preferably mounted in the casing of the valve 101 before described, see Figs. 3 and 4. This auxiliary valve is also of the three-way type and is adapted to establish communication not only with the port 103, but also with a by-pass tube 196 through which air is supplied from the main supply pipe 100. The barrel of the valve 195 may be rotated manually by a handle 197 and is provided with a radial arm 198 which, when the valve is rotated to inflate the tube, is moved into the dotted line position shown in Fig. 1, whereby it is disposed in the path of movement of the forward end of the link 124. When the valve is thus manually operated, air is supplied from the by-pass 196 through the barrel of the valve 195 and thence through the barrel of valve 101 to the inflation tube 102. Subsequently when the mold is closed, the link 124 will be moved forwardly, as previously explained, and in so doing, it will return the auxiliary valve 195 to its closed position, as shown by full lines in Figs. 2 and 4, and simultaneously turn the valve 101 to open position for admitting full air pressure to the tube while undergoing vulcanization.

It is believed that the operation of the device will be entirely clear from the preceding description, but a brief recapitulation may be helpful: Commencing with the parts in the positions shown in Figs. 1 and 3, with the mold open, the operator will first place an unvulcanized tube in the cavity of the lower mold section 19, connection of the valve stem with the air supply coupling 104 being simultaneously and automatically made, as described in the later application Serial No. 302,710 above referred to. He may, if desired, partially or further inflate the tube by swinging the valve handle 197 downwardly in the manner last described, the attendant ordinarily operating the valve 197 to turn on the air supply before inserting the tube in the mold. With one hand, he will next push rearwardly on the bar 94 to free the dog 90, and with his other hand, he will depress the handle 118 of the bell-crank lever 116 to turn the valve 64 to a position in which it supplies air or other pressure fluid to the lower end of the cylinder 56. As this is done, the lever 111 of the timing device will be swung forwardly to the position shown in Fig. 2 by virtue of its connection with the valve 64 through link 113 and lever 114, and such movement of the lever 111 will correspondingly move the arm 122 to its forward position within the case or housing 106. Upon the admission of pressure fluid to the cylinder, the upper mold section 20 is swung down to its closed position and locked therein through the connections previously described, but in the final locking movement of the parts, the rod 133 will be shoved downwardly by the rod 135 and rock the bell-crank lever 130 about its pivot 131, causing the dog 126 to draw the lever 112 to its forward position and, through its connections with the valve 101, opening up communication between the air supply pipe 100 and the tube inflating pipe 102 for the full pressure inflation of the tube, while shutting off communication between the by-pass pipe 196 and the port 103. Being movable with the lever 112, the arm 138 will at the same time be set to correspond with the setting of the companion arm 122. Immediately the arm 122 reaches its forward position, the pawls 153 and 157 are free to engage the teeth of the ratchet wheel 141, so that the continuously oscillating arm 155 will act at once to impart a step by step advancing movement to the composite disc 140 in a counterclockwise direction as indicated by the arrows in Figs. 3 and 4. Upon the closing of the mold, the vulcanization of the tube of course immediately starts, steam being circulated continuously through the heating chambers 28 and 29 in the usual manner. As the advancing movement of the composite disc continues, the shoulder 148 of the cam 142 reaches a position in which it passes out of contact with the shoulder 178 of the interponent 175 carried by the inflation and deflation control arm 138, whereupon said interponent falls by gravity and positions its tappet 179 in the path of movement of the reciprocating bar 170, which, as it moves to the right, will correspondingly rock the arm 138 and lever 112, carrying along the link 124 and turning the valve 101 to effect the deflation of the tube through the venting port 103 (see Fig. 3). Soon afterwards, the shoulder 149 of the other cam 143 will pass out of engagement with the shoulder 178 of the interponent 174 carried by the arm 122, whereupon its tappet 179 will fall into the path of movement of the reciprocating bar 170 and likewise cause it to move the arm 122 and lever 111 to the right, such movement of the lever 111, due to its connection with the valve 64, turning it to admit pressure fluid to the upper end of the cylinder 56 for the unlocking and opening of the mold (see Fig. 1). From the foregoing, it will be clear that the vulcanizing period is automatically measured and ended without dependence upon the human element.

The invention is extremely simple in construction and thoroughly dependable in operation. Obviously, various modifications may be resorted to, and the right is herein reserved to make such changes as fall within the scope of the appended claims without departing from the spirit of the invention.

Having thus described my invention, what I claim is:

1. Vulcanizing apparatus comprising a lower fixed mold section and an upper swinging mold section, power mechanism for raising and lowering the swinging mold section to open and close the mold, separate clamping means carried by the swinging mold section and operated by the power mechanism for automatically locking and unlocking the sections in the closing and opening of the mold, means for manually controlling the closing of the mold, time-controlling means for automatically controlling the opening of the mold at the end of a definite vulcanizing period, and means associated with said clamping means for initiating the operation of said time-controlling means as the mold is closed.

2. A vulcanizing mold comprising a pair of opposed mold sections movable toward and from each other to open and close the mold, means for locking the mold sections in closed relation, said means including a lever rockably supported on one of the mold sections, a valve for controlling inflation and deflation of an article confined between the mold sections, a bell-crank lever pivoted to one of the mold sections and having intermittent connection with the inflation and deflation valve, and means for connecting the bell-crank lever with the locking lever whereby to inflate the article as the mold is locked.

3. A vulcanizing mold comprising a fixed mold section and a swinging mold section movable toward and from the fixed section to open and close the mold, means for locking the mold sections in closed relation, said means including a lever pivoted on the swinging section, a valve for controlling inflation and deflation of an article confined between the mold sections, means for operating the valve to inflate the article as said lever is moved to its locking position, and means for automatically operating the valve to deflate the article prior to the opening of the mold at the end of a predetermined time cycle.

4. In combination with a vulcanizing mold having a pair of opposed mold sections movable toward and from each other to open and close the mold, means for locking the mold sections in closed relation, a valve to control inflation and deflation of an article confined between the mold sections, time-controlled mechanism comprising a periodically operable member connected to the valve, a constantly operable member, and trip mechanism whereby to move the periodically operable member in one direction by the constantly operable member to deflate the article, and connecting means between the locking mechanism and said periodically operable member whereby to actuate the valve to inflate the article as the mold is locked.

5. A vulcanizing mold comprising a pair of opposed mold sections movable toward and from each other to open and close the mold, means for inflating an article confined between the mold sections, means for manually controlling said inflating means to partially inflate the article prior to or simultaneously with the closing of the mold, and automatic means for subsequently rendering the manual means inactive and for controlling the inflating means to effect the full pressure inflation of the confined article after the closing of the mold.

6. A vulcanizing mold comprising a pair of opposed mold sections movable toward and from each other to open and close the mold, means for inflating an article confined between the mold sections including two separate controlling valves, manual means for opening one of said valves, and automatic means for closing said valve and for opening and closing the other valve.

In testimony whereof, I have affixed my signature hereto.

PETER DE MATTIA.